United States Patent [19]
Katayama

[11] Patent Number: 5,270,997
[45] Date of Patent: Dec. 14, 1993

[54] OPTICAL HEAD WITH REDUCED ABERRATION

[75] Inventor: Hiroshi Katayama, Higashihiroshima, Japan

[73] Assignee: Sharp Kabushiki Kaisha, Osaka, Japan

[21] Appl. No.: 641,261

[22] Filed: Jan. 15, 1991

[30] Foreign Application Priority Data

Jan. 22, 1990 [JP] Japan .................................. 2-12987

[51] Int. Cl.$^5$ .............................................. G11B 7/00
[52] U.S. Cl. ..................................... 369/112; 369/111
[58] Field of Search ............... 369/44.14, 44.11, 44.15, 369/44.16, 44.17, 44.18, 44.19, 44.21, 44.22, 44.23, 44.24, 111, 112; 359/507, 571, 513, 737, 813, 894

[56] References Cited

U.S. PATENT DOCUMENTS

| | | | |
|---|---|---|---|
| 4,730,295 | 3/1988 | Bressers | 369/44.41 |
| 4,775,967 | 10/1988 | Shimada et al. | 369/44.41 |
| 4,812,638 | 3/1989 | Ogata et al. | 369/44.23 |
| 5,023,858 | 6/1991 | Nakayama | 369/112 |

FOREIGN PATENT DOCUMENTS

| | | |
|---|---|---|
| 255305 | 2/1988 | European Pat. Off. . |
| 260569 | 3/1988 | European Pat. Off. . |
| 338840 | 10/1989 | European Pat. Off. . |
| 63-244416 | 10/1988 | Japan . |

Primary Examiner—W. R. Young
Assistant Examiner—P. W. Huber

[57] ABSTRACT

An optical head device for recording and/or reproducing information by using an optical recording medium includes a light source, an objective lens, a photo detector, an optical system including a collimator lens, a beam splitter, a convergent lens and a cylindrical lens, a housing for accommodating the light source, the photo detector and the optical system, and an optical glass plate for reducing aberration of the optical system and the objective lens. A light beam from the light source is turned to a parallel beam flux by the collimator lens to irradiate the objective lens, which provided drivably converges the parallel beam flux on the optical recording medium. The light beam reflected from the optical recording medium passes through the objective lens and reflected by the beam splitter in the optical system toward the photo detector. The light beam reflected by the beam splitter is converged on the photo detector by the convergent lens and the cylindrical lens. The characteristic of the present invention is that the optical glass plate for reducing the aberration seals the housing to protect the light source and the optical system from dust. The optical glass plate is set rotated about the axis of the parallel beam flux to a position reducing the aberration of the optical system and of the objective lens.

6 Claims, 7 Drawing Sheets

FOCUSING ERROR SIGNAL

ERROR SIGNAL

OPTICAL HEAD WITH REDUCED ABERRATION

BACKGROUND OF THE INVENTION

1. Field of the Invention

The present invention relates to an optical head device employed in for example an optical disk device.

2. Description of the Background Art

An optical disk device records and/or reproduces information by bringing an optical head device near to an optical recording medium. Generally, an optical head device comprises a light source, an objective lens mechanism, a photo detector and an optical system. In the optical head device, a light beam emitted from the light source is converged on the optical recording medium by means of an objective lens or the like. The converged light beam is reflected from the optical recording medium. The reflected light is led by the optical system to the photo detector. Then the optical head device carries out focusing and tracking for recording or reproducing information.

FIG. 1 schematically shows a structure of a general optical head device. Referring to the figure, the device comprises a fixed optical portion A and an objective lens driving mechanism B. An optical recording medium C is positioned below the objective lens.

The operation of the device shown in the figure will be described in the following. A light beam emitted from a semiconductor laser 1 is turned into parallel beam flux by a collimator lens 2. The parallel beam flux passes through a beam splitter 3 to enter the objective lens 4. The objective lens 4 converges the parallel beam flux on the optical recording medium C. The position of convergence is adjusted by driving the objective lens 4 by a driving mechanism, not shown. The optical recording medium C comprises a transparent plate 5, tracks 6 and guide tracks 6'. The alternating tracks 6 and guide tracks 6' are formed of a thin film of an amorphous alloy of rare earth or a transition metal constitute a recording medium. The light beam is controlled so as to converge on a track 6 by means of the objective lens 4. The light beam reflected from the optical recording medium C passes through the objective lens 4 to enter the fixed optical portion A. The light beam from the objective lens 4 is reflected by the beam splitter 3. The reflected light passes through a convergent lens 8 to enter a cylindrical lens 9. The light beam passed through the cylindrical lens 9 is turned into beam flux having astigmatism so as to converge on a photo detector 10 whose dividing line is inclined by 45° with respect to the generator of the cylindrical lens 9. An output from the photo detector 10 is processed by circuit means, not shown, and then it is converted into a focusing error signal. A focusing mechanism of the objective lens is controlled by the focusing error signal.

The principle of detecting a focusing error in the above described optical head device will be describe with reference to FIGS. 2A to 2F. FIGS. 2A, 2C and 2E show optical paths of the light beam reflected from the optical recording medium C passing through the objective lens 4, the convergent lens 8 and the cylindrical lens 9 to reach the photo detector 10. FIGS. 2B, 2D and 2F show the light beam irradiating a photo sensitive portion 20 of the photo detector 10. As shown in the figures, the photo sensitive portion 20 comprises four elements 10a, 10b, 10c and 10d. The boundaries of the four elements are two lines intersecting with each other perpendicularly. The boundaries are inclined with respect to the generator of the cylindrical lens 9 shown by an arrow in the figure. The center of the photo sensitive portion, that is, the intersecting point of the boundaries, is positioned at midway between two focusing points generated by astigmatism, when the light beam converges on a track 6 of the optical recording medium C as shown in FIG. 2A.

FIGS. 2A and 2B show the light beam converged on a track 6. FIGS. 2C and 2D show the light beam converged in front of the track 6. FIGS. 2E and 2F show the light beam converged behind the track 6.

The focusing error signal (FES) is represented as the following equation (1), where Sa, Sb, Sc and Sd represent light intensities irradiating the elements 10a, 10b, 10c and 10d of the photo sensitive portion 20, respectively.

$$FES = (Sa + Sc) - (Sb + Sd) \tag{1}$$

When the point of focus is on the track 6 as shown in FIG. 2A, a spot on the photo sensitive portion 20 is circular, and the light intensities irradiating the elements are the same, so that the signal FES provided in accordance with the above equation is 0. When the point of focus is in front of the track 6 as shown in FIG. 2C, the spot on the photo sensitive portion 20 is an ellipse having its major axis parallel to the generator (shown by an arrow) of the cylindrical lens. In this case, the light intensities Sb and Sd are higher than Sa and Sc. Therefore, the signal FES has a negative value. When the point of focus is behind the track 6 as shown in FIG. 2E, the spot on the photo sensitive portion 20 is an ellipse having its major axis vertical to the generator of the cylindrical lens 9. Then the light intensities Sa and Sc are higher than Sb and Sd, and the signal FES has a positive value. Based on the principle described above, the direction of defocus depends on whether the signal FES is positive or negative, and the amount of defocus depends on the level of the signal FES. Accordingly, the objective lens driving mechanism moves the objective lens to an appropriate position in accordance with the signal FES to converge the light beam on the optical recording medium.

Now, description will be given of a crosstalk in the focusing error signal caused when the position of the track is off the position of the light beam converged on the optical recording medium C.

Let us assume that there is no aberration in the optical system comprising a collimator lens, a beam splitter, a convergent lens, a cylindrical lens and an objective lens. FIGS. 3A to 3F show this ideal state. FIGS. 3A, 3C and 3E show positional relation between a track 6 of the optical recording medium C and a spot 11 of a light beam irradiating the optical recording medium C. FIGS. 3B, 3D and 3F show spot shapes of the light beam irradiating the photo sensitive portion 20 of the photo detector 10. If the center of the spot 11 is off the track 6 as shown in FIGS. 3A and 3E, the shape of the spot on the photo sensitive portion 20 is as shown in FIGS. 3B and 3F, respectively. If the track 6 is positioned at the center of the spot 11 as shown in FIG. 3C, the shape of the spot of the light beam irradiating the photo sensitive portion 20 is circular as shown in FIG. 3D.

As shown in FIGS. 3A to 3F, the horizontal boundary X—X of the photo sensitive portion 20 is parallel to the longitudinal direction of the track 6, while the vertical boundary Y—Y is vertical to the longitudinal direction of the track 6. The photo sensitive portion 20 is arranged such that the optical axis of the light beam passes through the center thereof. When the track 6 is positioned at the center of the spot 11, the spot will be circular as shown in FIG. 3D. Meanwhile, if the position of the track 6 is off as shown in FIGS. 3B and 3F, distribution of light intensity irradiating the photo sensitive portion 20 of the detector changes dependent on how much the track is off. If the optical system has no aberration, the distribution of light intensity is symmetrical about the boundary Y—Y. Therefore, even if the position of the track is off, the value of the focusing error signal calculated in accordance with the equation (1) is 0. Namely, imbalance of the distribution of the light intensity is offset, and the focusing error signal is not changed dependent on the deviation.

Next, let us assume that the optical system has the aberration. FIGS. 4A to 4F show deviation of the track and the shapes of the spot irradiating the photo sensitive portion of the photo detector when the optical system has the aberration. The three cases shown in FIGS. 4A to 4F correspond to the three cases shown in FIGS. 3A to 3F, respectively.

In the ideal case where the optical system has no aberration, the light spot irradiating the photo sensitive portion 20 of the photo detector 10 is symmetrical about the boundary Y—Y as shown in FIGS. 3A to 3F. If the optical system has the aberration, the light spot is distorted as shown in FIGS. 4B, 4D and 4F. The distortion is especially conspicuous when the direction of the aberration is inclined by about 45° to the longitudinal direction of the track 6. The distortion is not noticed when the direction of aberration is vertical or parallel to the longitudinal direction of the track 6. When the center of the light spot 11 is off the track 6, the shape of the light spot on the photo sensitive portion 20 is as shown in FIGS. 4B and 4F, respectively. The shapes of the light spot represented by the hatched portions in FIGS. 4B and 4F are both asymmetrical about the boundary Y—Y. In the case shown in FIGS. 4A and 4B, the focusing error signal is recognized as a positive value, while in the case of FIGS. 4E and 4F, it is recognized as a negative value. Therefore, it is proved that erroneous signals are generated due to the aberration. FIG. 5 shows a waveform of a focusing error signal generated when the light spot 11 crosses the track 6. In FIG. 5, the abscissa represents distance between the objective lens 4 and optical recording medium C, while the ordinate represents the level of the focusing error signal. If the optical system has an aberration, an erroneous signal is generated due to the deviation between the track 6 and the light spot 11, so that the waveform of the focusing error signal fluctuates. Especially, there is considerable fluctuation near the point of in-focus. In an ideal state where the optical system has no aberration, the waveform of the focusing error signal is a smooth curve. The aberration existing in the optical system makes unstable the control of focusing, and may prevents normal recording and reproducing.

Japanese patent Laying Open No. 63-244416 discloses an optical information detecting device comprising an optical system having a flat glass plate for reducing influence of aberration. FIG. 6 shows one embodiment of the optical information detecting device. In this device, a flat plate 12 formed of glass having both surfaces flat is arranged between a collimator lens 2 and a semiconductor laser 1 as a light source. The flat plate 12 can be rotated about a optical axis 13. Other components of the device are the same as those shown in FIG. 1. When a flat plate having the thickness of t and a reflective index of n is arranged inclined by $\theta$ in a light beam having an angular aperture of $\alpha$, generated astigmatism w is represented as:

$$w = \frac{t(n^2 - 1)\sin^2\theta}{2(n^2 - \sin^2\theta)^{3/2}} \sin^2\alpha \qquad (2)$$

This device eliminates the astigmatism remaining in the optical system by utilizing the astigmatism in accordance with the equation (2) and provides superior focusing error signal. The direction of the astigmatism can be adjusted by rotating the flat plate 12 about the optical axis 13. The magnitude of the astigmatism can be changed by the inclination $\theta$, the thickness t or the reflection index n of the parallel flat plate.

However, in the conventional device, a mechanism supporting the flat plate was complicated, since the flat plate for reducing the astigmatism was mounted movable to adjust rotation and inclination $\theta$. In addition, when the optical system including the flat plate was to be accommodated in a housing, the mechanism for adjusting the rotation and inclination of the flat plate must be provided in the housing, which mechanism was complicated.

SUMMARY OF THE INVENTION

An object of the present invention is to provide a optical head device capable of reducing aberration of an optical system by a mechanism which is more simple than the prior art.

Another object of the present invention is to provide a simple system preventing degradation of a focusing error signal derived from aberration in an optical system of an optical head device.

A further object of the present invention is to provide an optical head device which is easy to handle comprising simple mechanism for correcting the aberration provided in a housing accommodating an optical system.

A still further object of the present invention is to provide an optical head device having a housing accommodating a light source and an optical system sealed so as to protect the light source and the optical system from dust.

The present invention provides an optical head device for recording and/or reproducing information by using an optical recording medium. The present invention comprises a light source which is typically a semiconductor laser, an objective lens for converging light beam emitted from the light source onto the optical recording medium, a photo detector for detecting the light beam reflected from the optical recording medium, and an optical system for guiding the light beam emitted from the light source to the objective lens and to guide the light beam reflected from the optical recording medium to the photo detector. In the optical head device in accordance with the present invention, the light source, the photo detector and optical system are accommodated in a housing having an opening between the optical system and the objective lens. Further, the present invention comprises an optical plate provided substantially vertical to the optical axis of the light beam passing through the opening of the housing and sealing the housing. The optical plate is provided for reducing the aberration of the optical system and of the objective lens. The optical plate is set at a position enabling reduction of aberration by rotating the same about the optical axis.

The optical plate is generally formed of glass. The optical plate may have both surfaces substantially flat or it may have one surface spherical.

The optical plate may be provided in a holder. The holder holding the optical plate is rotatably attached to the housing, and by rotating the holder about the optical axis, the optical plate can be set at a position to reduce the aberration. After setting, the optical plate as well as the holder may be fixed.

The optical system in accordance with the present invention comprises, for example, a collimator lens for turning the light beam emitted from the light source into parallel beam flux, a beam splitter passing the parallel beam flux from the collimator lens and reflecting the light reflected from the optical recording medium to the direction of the photo detector, and a lens for turning the light beam reflected by the beam splitter to a light beam having astigmatism and for converging the light beam onto the photo detector.

An advantage of the present invention is that an optical head device capable of reducing aberration of the objective lens and of the optical system can be realized by a simple mechanism. The optical plate for reducing the aberration is provided to close the opening of the housing. The optical plate may be provided as a lid of the opening. Provision of the optical plate can be realized by a very simple structure.

Another advantage of the present invention is that an optical head device having the housing accommodating the light source, the optical system and the photo detector sealed by the optical plate is provided. The sealing of the housing prevents entrance of dust into the housing. Therefore, parts of the elements in the housing, especially the optical system can be protected from dust. Thus the optical head device has longer life. The most important characteristic of the present invention is that the optical plate for reducing the aberration is used for sealing the housing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 7:
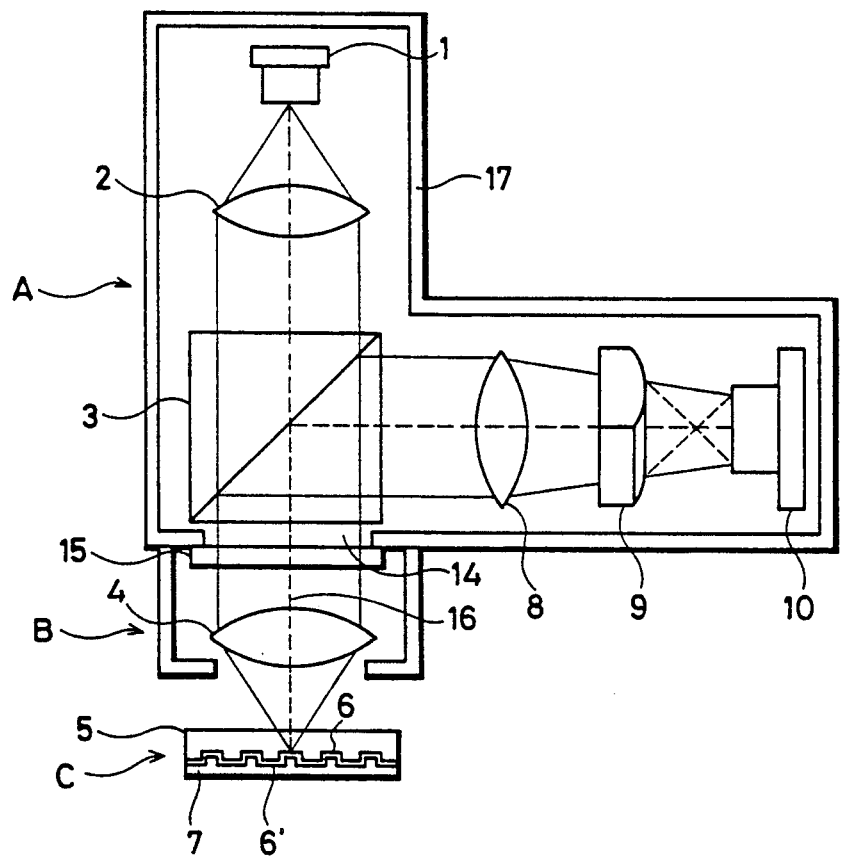
FIG. 7 is a schematic diagram showing a preferred embodiment of the present invention.

A preferred embodiment of the optical head device in accordance with the present invention will be described in detail with reference to the figures. Referring to FIG. 7, the optical head device comprises a fixed optical portion A accommodated in a housing 17, and an objective lens 4 for converging a light beam from the fixed optical portion A onto an optical recording medium C. The fixed optical portion A comprises a semiconductor laser 1 as a light source, a collimator lens 2, a beam splitter 3, a convergent lens 8, a cylindrical lens 9 and a photo detector 10. The objective lens 4 is provided movable in a driving mechanism B. The housing 17 has an opening 14 at a portion facing the objective lens 4. The opening 14 is closed by an optical plate 15 formed of a transparent glass having both surfaces flat. The optical plate 15 is set rotatable about the optical axis 16 of the light beam. The optical plate 15 is the most important part of the optical head device of the present invention.

The light beam emitted from the semiconductor laser 1 is turned into parallel beam flux by the collimator lens 2. The parallel beam flux passes through the beam splitter 3 and the optical plate 15 to enter the objective lens 4. The objective lens 4 converges the parallel beam flux on the optical recording medium C. The convergence is controlled by driving the objective lens 4. The light beam reflected by the optical recording medium C passes through the objective lens. The light beam from the objective lens 4 is reflected by the beam splitter 3. The reflected light is converged on the photo detector 10 by the convergent lens 8 and the cylindrical lens 9. In the device shown, the system for focusing is in accordance with the principle of the above described conventional device.

The optical plate 15 closing the opening 14 reduces the aberration of the optical system comprising the fixed optical portion A and the objective lens 4. Since the optical plate is flat, theoretically it does not generate any aberration in the parallel beam flax and it does not operate as a lens. However, actually an aberration is always generated in the optical system by the optical plate. It is very difficult to eliminate the aberration. The aberration is drived from small roughness of the surfaces, small warps formed during manufacturing of the optical plate and from distortion in the material. The optical head device of this embodiment positively utilizes the aberration generated by the optical plate. The aberration existing in the optical system, especially, the astigmatism is offset by the aberration generated by the optical plate. The offset of the aberration provides a superior focusing error signal.

The direction of aberration generated by the optical plate 15 can be changed by rotating the optical plate 15 about the optical axis 16. Therefore, even if the direction of the aberration is different in different optical systems, correction can be made corresponding to the optical systems by changing the rotation angle of the optical plate.

Figure 1:
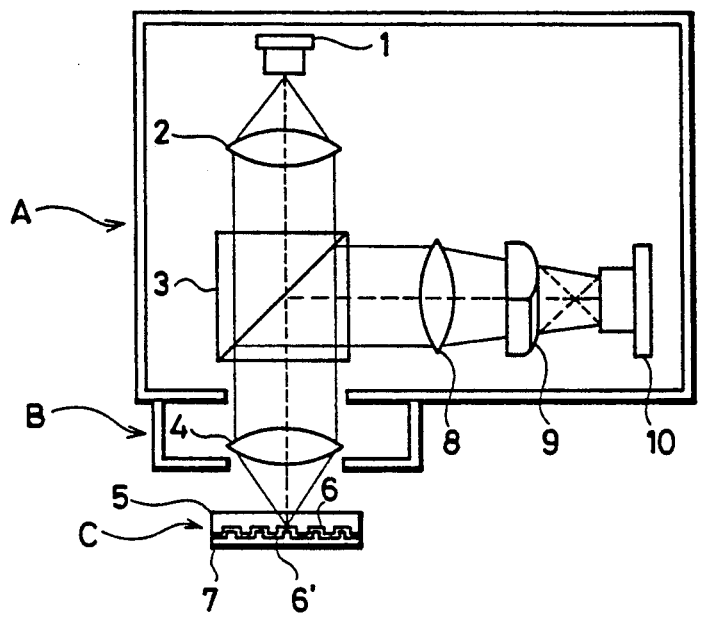
FIG. 1 is a schematic view showing a mechanism of the optical head device.
Figure 2A:
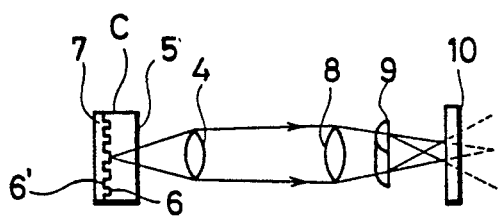
FIGS. 2A to 2F show the principle for detecting a focusing error of the optical head device.
Figure 2B:
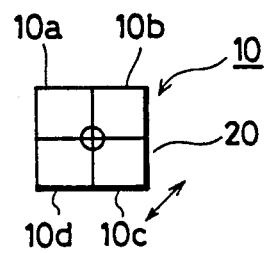
Figure 2C:
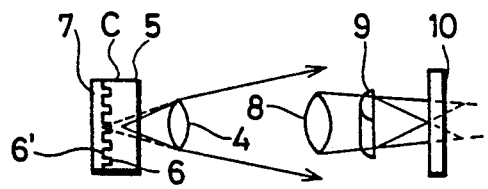
Figure 2D:
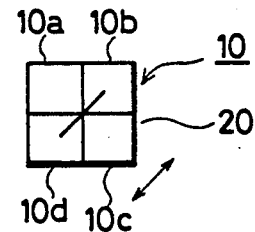
Figure 2E:
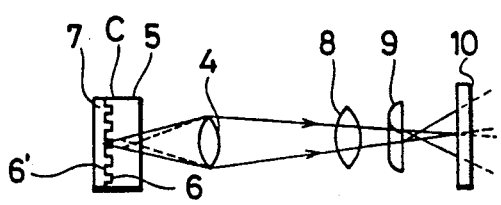
Figure 2F:
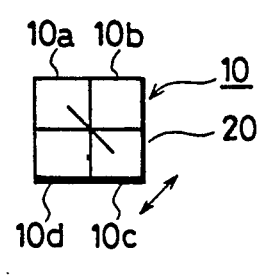
Figure 3A:
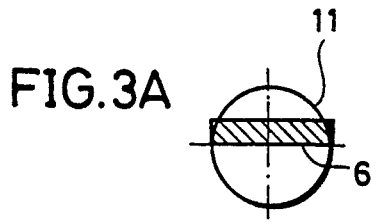
FIGS. 3A to 3F and FIGS. 4A to 4F illustrate variation of light spots irradiating the photo detector, when positional relation between the spots and tracks on the optical recording medium is changed.
Figure 3B:
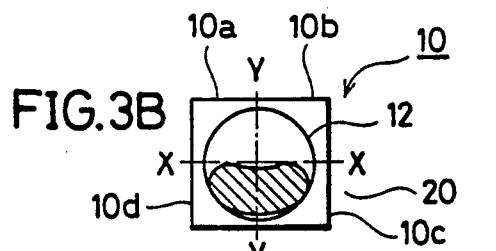
Figure 3C:
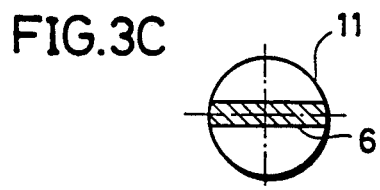
Figure 3D:
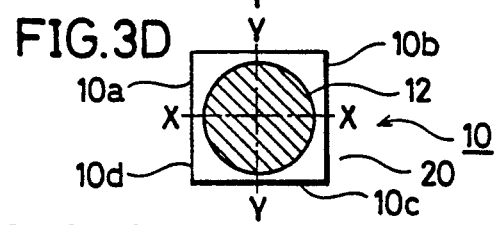
Figure 3E:
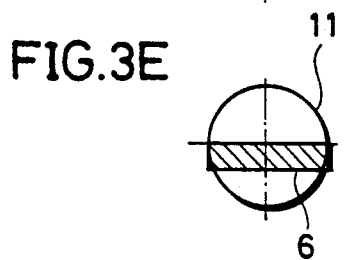
Figure 3F:
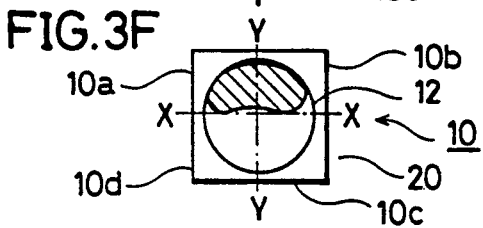
Figure 4A:
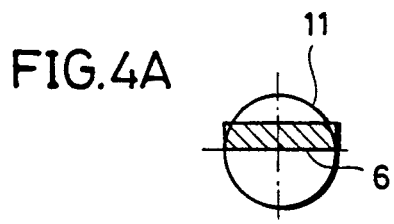
Figure 4B:
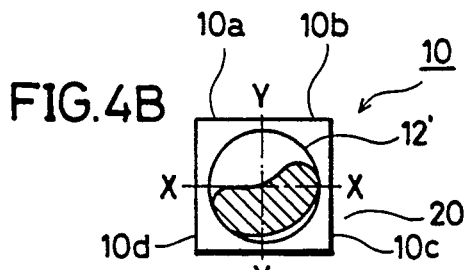
Figure 4C:
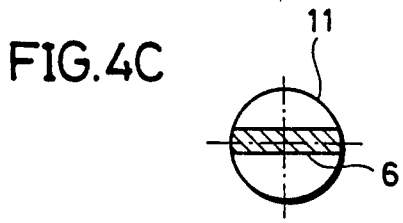
Figure 4D:
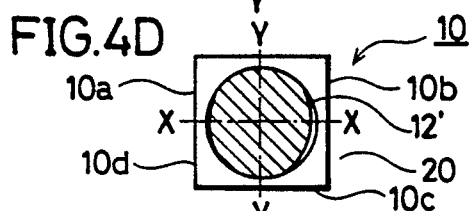
Figure 4E:
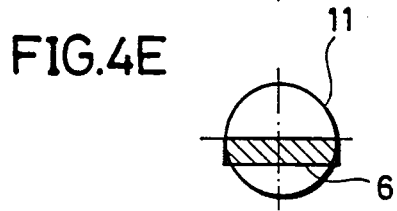
Figure 4F:
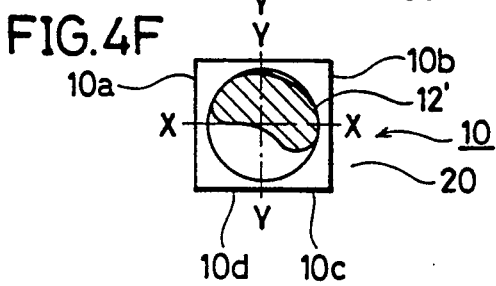
Figure 5:
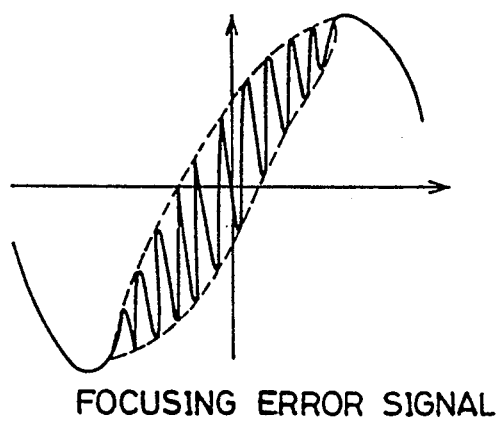
FIG. 5 shows a waveform of the focusing error signal generated in the prior art.
Figure 6:
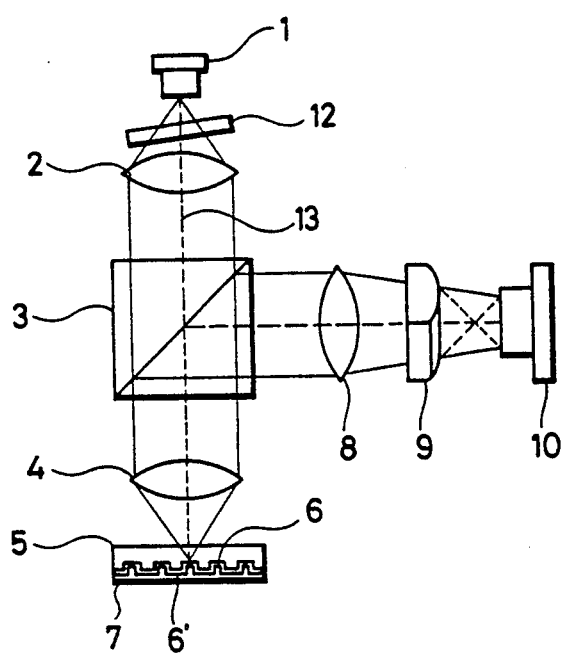
FIG. 6 is a schematic diagram showing a conventional optical head device.
Figure 8:
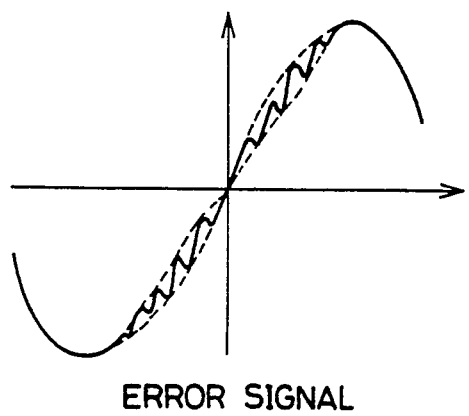
FIG. 8 shows a waveform of a focusing error signal generated in the preferred embodiment of the present invention.

The focusing error signal provided by the optical head device of this embodiment is as shown in FIG. 8. In FIG. 8, the abscissa represents the distance between the objective lens 4 and the optical recording medium C, and the ordinate represents the level of the focusing error signal. As is apparent from the comparison between FIG. 8 and FIG. 5 showing the focusing error signal of the conventional device, the fluctuation of the waveform of the focusing error signal in FIG. 8 is smaller and less frequent than the prior art. Especially, the fluctuation near the in-focus point is significantly suppressed. Thus focusing control can be stably carried out in this device.

Figure 9:
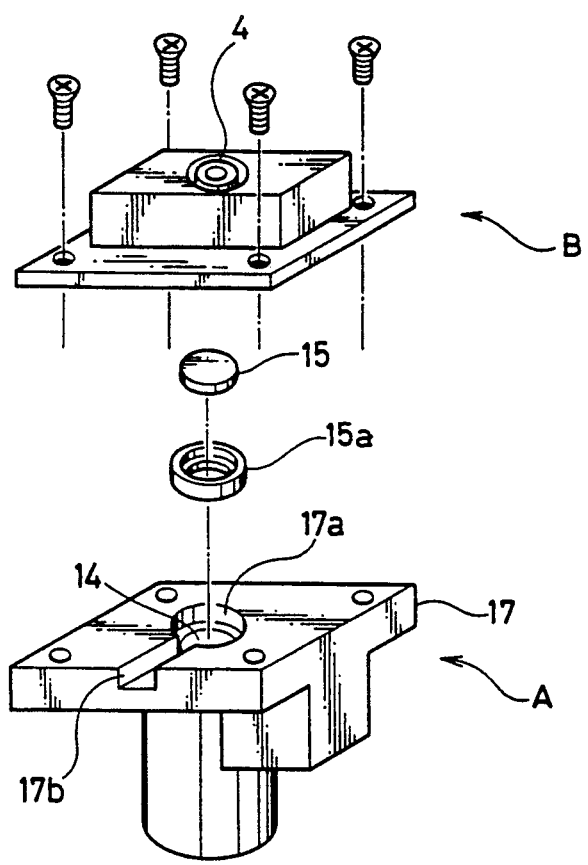
FIG. 9 is a perspective view showing attachment of the optical plate for reducing the aberration of the objective lens and of the optical system at the opening of the housing, in the preferred embodiment of the present invention.

A structure as shown in FIG. 9 may be put in practice as a preferred embodiment of the present invention. Referring to FIG. 9, the optical plate 15 for reducing the aberration has a disk shape. The optical plate 15 is fitted in a holder 15a. The holder 15a having the optical plate 15 fitted therein is fitted to a concave portion 17a of the housing 17. The opening 14 of the housing 17 is formed at the bottom of the concave portion 17a. Namely, the opening 14 of the housing 17 is closed by the optical plate 15 as shown in the figure. A notched portion 17b is formed on the housing 17 which is communicated to the concave portion 17a from a side surface. As shown in the figure, the driving mechanism B of the objective lens is attached to the housing 17 by means of a screw. By sticking an appropriate member through the notched portion 17b to move the holder 15a, the holder 15a can be rotated. The optical plate 15 is rotated together with the holder 15a. Even if the direction of aberration in the optical system and in the objective lens is different, aberrations in different directions can be reduced by using the same optical plate, by rotating the optical plate 15. After the aberration in the optical system comprising the fixed optical portion A and the objective lens 4 is reduced by rotating the optical plate 15 by an appropriate angle, the holder 15a may be fixed by adhesion or the like.

In the above described embodiment, the optical plate for reducing the aberration can be attached very easily by fitting the same at a concave portion of the housing by means of a holder. Such a structure for reducing the aberration is very simple. Since the aberration of the optical system is sufficiently reduced by this optical plate, a superior focusing error signal can be provided. Even if the directions of aberrations of the optical systems are different in different optical head devices assembled, the aberrations can be reduced by rotating the optical plate. The rotatably provided adjusting mechanism in the above described embodiment is very simple and manufacturing thereof is very easy compared with the prior art.

In addition, in the above described embodiment, the opening 14 of the housing 17 is sealed by the optical plate 15, so that the optical plate 15 serves to prevent entrance of dust into the housing. Conventionally, the optical system in the housing having complicated structure and having a number of exposed optical surfaces was much affected by dust, and in the worst case, recording and/or reproduction of information could not be carried out. However, in the present invention, entrance of dust can be prevented as the housing is sealed by the optical plate, and accordingly degradation of optical characteristics of the optical system can be prevented. As described above, the optical plate mainly has two functions, those are, to reduce the aberration in the optical system and to prevent entrance of dust. The optical plate in the above embodiment has both surfaces made flat. Such a flat plate can be manufactured relatively easily, and is ready to be practically used. However, the optical plate in accordance with the present invention may not necessarily be flat. An optical plate having at least one surface made spherical can be formed in accordance with the present invention. In such a case, the optical plate can reduce the expected aberration by the function of the lens. Further, the mechanism for mounting the optical plate and for adjusting rotation is not limited to that shown in the above embodiment but various modifications may be made within the scope of the invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical head device for recording and/or reproducing information by using an optical recording medium, comprising:
   a light source;
   a movable objective lens for converging a light beam emitted from said light source on the optical recording medium;
   photo detecting means for detecting the light beam reflected by the optical recording medium;
   an optical system for guiding the light beam emitted from said light source to said objective lens and for guiding the light beam reflected from said optical recording medium to said photo detecting means;
   a housing for accommodating said light source, said photo detecting means and said optical system, having an opening formed between said optical system and said objective lens; and
   an optical plate provided substantially orthogonal to an optical axis of the light beam passing through the opening of said housing to seal said housing;
   said optical plate being rotatable about said optical axis to a position reducing aberration of said objective lens and of said optical system;
   said optical plate sealing said housing so as to prevent dust from entering said housing.

2. An optical head device according to claim 1, wherein
   said optical plate is formed of glass.

3. An optical head device according to claim 1, wherein
   both surfaces of said optical plate are substantially flat.

4. An optical head device according to claim 1, wherein
   at least one surface of said optical plate is spherical.

5. An optical head device according to claim 1, wherein
   said optical plate is held in a holder supported rotatably on the housing before setting the position of said optical plate for reducing the aberration determined by rotating said holder.

6. An optical head device according to claim 1, wherein
   said optical system comprises
   a collimator lens for turning the light beam emitted from said light source to a parallel beam flux, a beam splitter for passing the parallel beam flux from the collimator lens and for reflecting the light beam reflected from said optical recording medium to a direction of said photo detecting means, and a lens for converging the light beam reflected by the beam splitter on the photo detecting means.

* * * * *